(No Model.)

R. I. BROWN.
MEANS FOR FASTENING PARALLEL WIRES TOGETHER.

No. 543,125.  Patented July 23, 1895.

Witnesses:
Robert Williams Jr.
Arthur G. Tods

Inventor:
Robt. I. Brown

UNITED STATES PATENT OFFICE.

ROBERT I. BROWN, OF BROOKLYN, NEW YORK.

MEANS FOR FASTENING PARALLEL WIRES TOGETHER.

SPECIFICATION forming part of Letters Patent No. 543,125, dated July 23, 1895.

Application filed July 28, 1894. Serial No. 518,896. (No model.)

*To all whom it may concern:*

Be it known that I, ROBERT INGRAM BROWN, a citizen of the United States, residing in Brooklyn, in the county of Kings and State of New York, have invented a new and useful Means for Fastening Parallel Wires, Ropes, or Cables Together, of which the following is a specification.

This invention relates to improvements in the use of wire or ropes as a means for the transmission of power, and more especially to the means for attaching two or more parallel wires, ropes, or cables together.

The objects of this invention are, first, to supply the ropes or wires with firmly-attached clips, which may be easily put in place or removed and which, by their shape, shall be readily available to transmit the power to or from the ropes or wire; secondly, to attach two or more parallel transmission ropes or wires to each other, so that they shall travel at the same speed and work evenly together as a belt; thirdly, to satisfactorily unite the ends of such belting. I attain these objects by the means illustrated in the accompanying drawings, in which—

Figure 1:
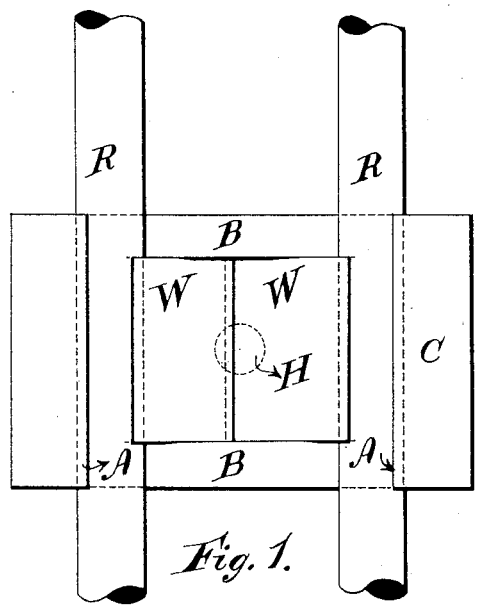
Figure 2:
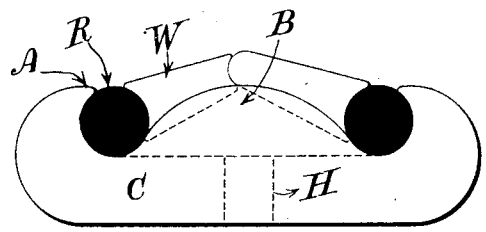
Figure 3:
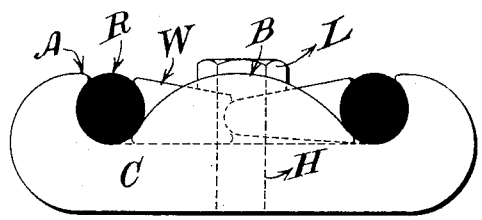
Figure 4:
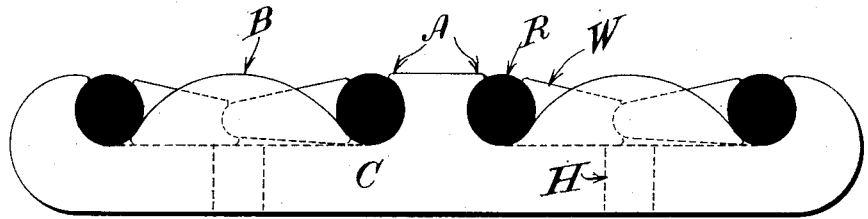
Figure 5:
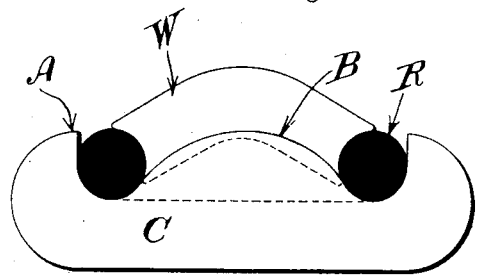

Figure 1 shows a plan of the simple clip. Fig. 2 is an end view showing the method of attaching the clip. Fig. 3 is an end view of the clip when attached. Fig. 4 is an end view showing the clip attached to four ropes. Fig. 5 shows a practical equivalent to Fig. 2, but of more economical construction.

Similar letters refer to similar parts throughout the several views.

C is the main body of the clip and has the ends or corners A, which resist the strain caused by the wedges or strut W W when in place. The concave curve of these corners A is usually smaller than the diameter of the rope for which the clip is adapted.

The clip may be placed in its proper position longitudinally on the wires or ropes and the strut W W forced transversely to the line of the wires or ropes into place without any tendency to move the clip from its proper position. The gripping pressure is produced on the toggle-joint principle, and the wedges W are entirely prevented from longitudinal motion in the clip by the sides B. Consequently the wedges will not be released, whether the strain from the rope be backward or forward, as it varies at the driving or driven wheel. The sides B serve also as bearing-surfaces for the sprockets on the wheels over which the wire ropes R work. The hole H in the main body of the clip is made therein for the purpose of enabling the wedges W to be released by means of a punch, which may be driven through the hole H against the wedges, thereby knocking them out, as will be readily understood.

The wedges W are here shown wedge-shaped, but this is not necessarily so. One end has a concave curvature slightly less in radius than that of the rope. The other ends are usually made one concave and one convex to fit into each other, as shown.

The method of attachment is as follows: The clip C, ropes R R, and wedges or strut W W are placed in the position shown in Fig. 2. The abutting ends of the wedges are then pressed flat against the main body of the clip C, thus compressing the ropes R and R and holding them firmly in a powerful vise as the abutting ends of the wedges W and W have passed the dead-center and the pressure keeps them firmly against the clip, or a bolt L in Fig. 3 may be passed through the wedges and screwed into H to hold the former in place when desired.

It is obvious that the clip C may be made in various shapes, with bolt-holes, lugs, and other projections, so that it may be readily attached to any desired object, and it may be made to embrace any number of ropes or wires. The curved surfaces coming in contact with the ropes may be made with projections to penetrate the rope or may be covered with any material to increase the adhesion.

It is not necessary that the means H for removing the strut shall have any particular shape or position in the clip and it may be entirely omitted when desired. Neither is it necessary to my invention that the corners or lugs A should have a concave curve slightly smaller than the diameter of the rope or wire to be held. Any shape may be given to the surface against which the rope or wire is driven by the strut, so long as it is adapted to retain said rope or wire. This also applies to the ends of the strut where coming in contact with said wires or ropes. Neither is the concavo-convex sliding joint between the wedges an essential feature, and likewise the guards B may be varied or omitted when not desired. It is preferable that the wire or rope should not be completely encircled by the clip and wedge, but an uninterrupted edge left to facilitate riding over idlers, &c., as shown.

The style shown in Fig. 5 is a very successful and easily made vise. Here the toggle-wedges are made in one piece, the sliding concavo-convex joint being replaced by continuous metal, which is bent while the toggle is being pressed into place, and the restraining-surfaces against which the wires are forced are originally made straight and parallel, leaving it to the toggle to force the wire to make its own curved seat as far as is necessary.

While I have shown and described my invention as applied to ropes or wires, yet I do not mean to limit my invention to its use with such.

A device embodying my invention may be used for the purpose of connecting together two or more lengths of wire or of rope or cable or the like, the ends which are desired to be united being placed in abutment and held there against withdrawal by means of the pressure of the clip and wedges, as before described.

Having thus described my invention, what I claim as new, and desire to secure by Letters Patent, is—

1. A clip for uniting one or more pairs of wires or ropes, comprising the combination of a main or body part with lugs to confine each pair of wires or ropes and a toggle strut separating each of said pairs of wires or ropes and forcing them rigidly against the confining lugs.

2. A clip for uniting one or more pairs of parallel wires or ropes, consisting of a body part from which lugs project to confine said wires or ropes, and a self locking toggle strut separating each pair of wires or ropes and forcing them rigidly against the confining lugs.

3. A clip to unite two or more parallel wires, ropes or the like together, which consists of a main or body portion, having its sides or edges recessed to partially embrace the wires or ropes, and toggle wedges inserted between the wires or ropes, adapted to engage with each other and with the wires or ropes so as to rigidly lock them together and to the clip, substantially as set forth.

4. A clip to unite two or more parallel wires, ropes or the like together, which consists of a main or body portion having its sides or edges recessed to partially embrace the wires, and toggle wedges interposed between the wires or ropes, adapted to engage with each other and with the wires or ropes, one end of each of said wedges being recessed or concaved to partially embrace the wires or ropes, and the other end of one wedge being concaved and the other end of the other wedge being convexed and adapted to fit into the concaved end of the first wedge, so as to securely lock them together and to the clip, and to the wires or ropes, substantially as set forth.

5. A clip comprising the combination of the body, C, having lugs, A, to partially embrace wires, ropes or the like, toggle-wedges, W, W, which are adapted to lock themselves when they pass the dead center, and the side pieces, B, to prevent longitudinal motion of the wedges, substantially as and for the purpose set forth.

ROBT. I. BROWN.

Witnesses:
ROBERT WILLIAMS, Jr.,
ARTHUR G. TARTAS.